March 18, 1969 W. K. ENGLISH 3,434,126

ODD NUMBER MAGNETIC CORE COUNTER

Filed Nov. 8, 1963

WILLIAM K. ENGLISH
INVENTOR.

BY Samuel Lindenberg

ATTORNEY

1

3,434,126
ODD NUMBER MAGNETIC CORE COUNTER

William K. English, Menlo Park, Calif., assignor to AMP Incorporated, Harrisburg, Pa.

Filed Nov. 8, 1963, Ser. No. 322,369
U.S. Cl. 340—174 8 Claims
Int. Cl. G11b 5/00

ABSTRACT OF THE DISCLOSURE

A magnetic core ring counter, made of multiaperture cores is operated at twice the speed of the usual two-core per binary bit multiaperture core ring counter by constructing an $n$ stage ring counter having a count capacity of $n$, where $n$ is odd, using 2 $n$ serially coupled cores. A count, indicating output, is derived as an OR function from different pairs of cores, determined as the small $a$th core and $a+n$th core, where $a$ is any integer from 1 to $n$.

This invention relates to magnetic core counters and more particularly to improvements therein.

A ring counter is essentially a shift register having a predetermined length or number of stages "$n$." Each stage is capable of representing a binary bit. One of the stages in the register will be in its "1" binary representing state while all the other stages of the register will represent a binary "0." The count of the ring counter is determined by the location of the "1" in the counter. The counter or register is then advanced one bit for each count.

Multiaperture magnetic core shift registers usually contain two magnetic cores for each stage. These shifts registers are inherently two phase devices since information may not be stored in both the odd and the even core of a stage at the same time. Accordingly, a multiaperture magnetic core register which is to be used as a ring counter, must have an even number of cores, two cores per bit and for each count must be advanced two cores (one bit). If the length of the ring counter $n$ is an even number, the register may be operated in a mode which advances only one core per count. If the length of the ring counter is an odd number, however, the counter must be operated in a mode which advances two cores per count since the number of cores traversed by the one bit must be even. As a result, odd number ring counters are operated to traverse two cores per bit or per count, which is half of the potential operating speed for an even number ring counter.

An object of the present invention is the provision of a multiaperture magnetic core ring counter which can operate at twice the speed of the previously constructed odd length multiaperture core ring counter.

Still another object of the present invention is the provision of a unique, odd length ring counter made of multiaperture cores, which is operable at twice the speed of the usual two core per binary bit, multiaperture core, ring counter.

These and other objects of the present invention may be achieved by constructing an $n$ stage ring counter having a count capacity of $n$, where $n$ is odd, using 2 $n$ serially coupled cores. A count indicating output is derived as an OR function from different pairs of cores, the two cores in a pair being determined as the $a$th core and the $a+n$th core where $a$ is any integer from 1 to $n$. A standard drive winding arrangement is employed wherein all the odd cores of the counter are simultaneously cleared, followed by the application of a clearing drive to all of the even cores of the counter.

The counter is operated in a one core per count mode, and it takes 2 $n$ counts to circulate the "one" remanent state of a core completely around the counter once. The

2 count readout is energized at every count resulting in the desired $n$ bit ring counter. Either a dynamic or an RF readout may be derived simply by winding the readout winding for a pair of cores in series. (The minor apertures employed for the RF readout, and the major apertures employed for the dynamic readout.)

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
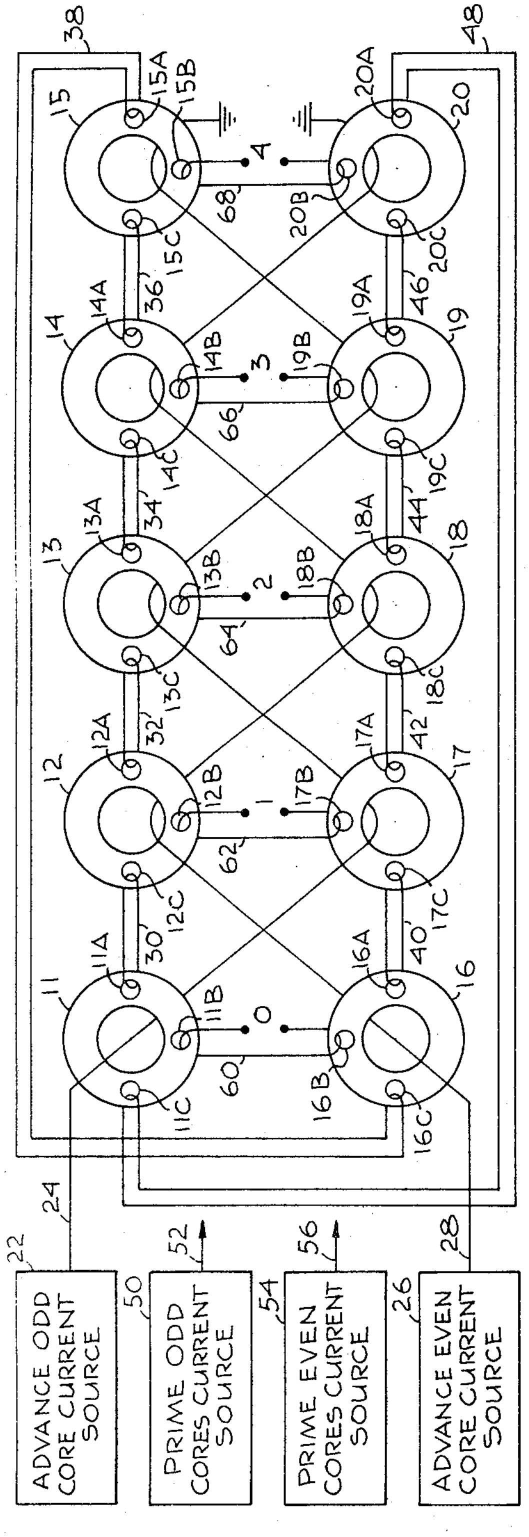
FIGURE 1 is a schematic drawing of an embodiment of the invention.

Referring now to FIGURE 1, there may be seen a schematic diagram of an embodiment of this invention. By way of illustration, a five stage ring counter is shown. Ten magnetic cores are employed, divided into two groups, one group bears reference numerals 11 through 15, the second group bears reference numerals 16 through 20. The designation of the cores as odd or even corresponds to the odd or evenness of the reference numerals.

An advance odd core current source 22 applies current to drive all the odd cores, respectively 11, 17, 13, 19, 15, to their clear states. It does this by applying a current of sufficient amplitude, as determined in a manner well known by those skilled in the art, to an advanced odd core winding 24. This winding is threaded through the central or main apertures of the magnetic ferrite multiaperture cores which are designated by the odd reference numerals.

An advance even core current source 26 applies a current to an advance even winding 28, which drives to their clear states all of the magnetic cores respectively 16, 12, 18, 14, 20, which have the even reference numerals applied thereto.

A transfer winding, respectively 30, 32, 34, 36, 38, 40, 42, 44, 46, 48, is provided for coupling the minor apertures respectively 11A, 12A, 13A, 14A, 15A 16A, 17A, 18A, 19A, 20A, of the cores, respectively 11 through 20 group, to the input minor apertures respectively 12C, 13C, 14C, 15C, 16C, 17C, 18C, 19C, 20C, 11C of the cores, respectively 12 through 20 and 11.

A prime odd core current source 50 applies priming current pulses to a prime odd core winding 52, which is shown fragmentarily in the interest of maintaining clarification in the drawings. The prime odd core winding 52, as is well known in the art, is coupled to the odd cores 11, 13, 17, 19 by being wound therein through their output minor apertures respectively 11A, 13A, 15A, 17A, and 19A. A prime even core current source 54 applies priming current pulses to a prime even winding 56, shown fragmentarily in the interests of maintaining clarification in the drawing. The prime even winding 56 is coupled to the even cores 12, 14, 16, 18, 20 by being wound thereon through their minor apertures respectively 12A, 14A, 16A, 18A, and 20A.

By way of illustration, outputs indicative of the count in the ring counter are derived by employing a single output winding, respectively, 60, 62, 64, 66 and 68, for each pair of cores. The cores of a pair are determined as the $a$th core and the $a+n$th core, where $a$ is any integer from one to $n$. Thus, the output winding 60 is serially coupled to the cores 11, 16 by passing through readout apertures 11B, 16B. The output windings 62 through 68 are similarly respectively coupled to the core pairs 12 and 17, 13 and 18, 14 and 19, 15 and 20, by passing through their respective readout apertures. The minor readout apertures 11B through 20B may be primed by being coupled to the respective prime windings 52, 56, or RF may be applied to these windings from a source not shown, to provide an output when the core is in its "1" state. Alternatively, outputs may be taken in well known manner by means of windings which are serially coupled through the cores by passing through their major apertures.

It is believed that the operation of the embodiment of the invention should be apparent from the description of the drive windings which has preceded. Assume, that the magnetic core 11 has been placed in its "1" and primed state of magnetic remanence. The advance odd core current source 22 applies a clearing current to the winding 24 which results in a transfer of the "1" state of magnetic remanence to the magnetic core 12. The prime even core current source then primes the magnetic material surrounding the output minor aperture 12A. Thereafter, the advance even core current source 26 is energized to apply clearing current to the winding 28. This causes a transfer of the "1" state from the core 12 to the core 13. Its output aperture 13A is primed by current applied from the prime odd core current source 50 to the winding 52. Thereafter, the advance odd core current source again applies current to the winding 24. This transfers the "1" state of the core 13 to the core 14.

Core 14 is primed by current being applied to the priming winding 56 from the prime even core current source 54. Thereafter, the advance even current source 26 applies current to the winding 28 whereby the "1" state of core 14 is applied or transferred to the core 15. Core 15 is primed by current being applied from the prime odd core current source 50 to the winding 52. Upon the application of current to the winding 24 from the advance odd core current source 22, the "1" state of the core 15 is transferred to core 16. It will be appreciated, from the preceding description, that the "1" state of the core 16 is propagated to core 17, then to core 18, then to core 19, then to core 20, and then around back to core 11 in response to the alternate excitation of the advance odd core current source and the advance even core current source as well as the prime odd core current source and the prime even core current source.

It should now be appreciated how the arrangement shown in FIGURE 1 operates as a ring counter. While the time required for the "1" to circulate through every core in the ring counter is 2 $n$, or ten counts, because of the unique arrangement shown, the full count readout from the counter is energized at every $n$ count, resulting in the desired $n$ or five bit ring counter. Accordingly, the odd length ring counter operates at twice the speed of an ordinary two core per bit multiaperture core ring counter.

Figure 2:
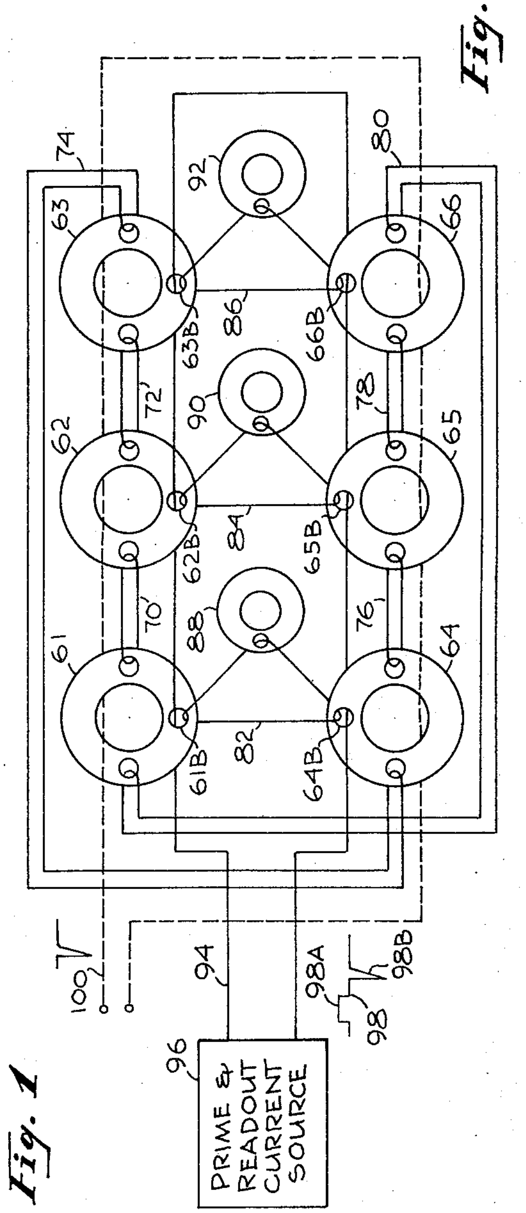
FIGURE 2 is a schematic drawing illustrating how the embodiment of the invention is used to transfer its count to a set of storage cores.

It often is desirable, to transfer the count which is in a ring counter to a set of storage cores at some predetermined time. This may be accomplished using the odd length counter described in connection with FIGURE 1, even though the two cores feeding into the storage core are opposite in phase. FIGURE 2 is a simplified circuit diagram of a three count counter, in accordance with this invention, entering its count into storage cores. The logic employed to the wiring of the cores is identical with that shown and described in connection with FIGURE 1. Accordingly, this will not be reiterated. Further, the drive windings for the cores will not be shown since this has already been described and shown in detail in connection with FIGURE 1. The three count ring counter consists of six cores respectively 61 through 66. As in FIGURE 1, a transfer winding 70 couples core 61 to core 62, a second transfer winding 72 couples core 62 to 63, a third transfer winding 74 couples core 63 to core 64. A transfer winding 76 couples core 64 to core 65, another transfer winding 78 couples core 65 to core 66, and a third winding 80 couples the last core 66 to the first core 61.

Each pair of cores ($a$ and $a+n$) has an output winding which is serially inductively coupled to these cores. Thus, the output winding 82 is serially inductively coupled to cores 61 and 64 by passing through their readout apertures 61B, 64B with the same relative sense. Output winding 84 is serially inductively coupled to the cores 62 and 65 by passing through their readout apertures respectively 62B, 65B with the same relative winding sense. Output winding 86 is inductively coupled to the cores 63, 66 by passing through their readout apertures respectively 63B, 66B with the same relative winding sense.

The respective output windings 82, 84, 86 are inductively coupled to the memory cores respectively 88, 90, 92, by passing through the input apertures of these memory cores. A priming and readout winding 94 is connected to receive current from a prime and readout current source 96. The winding 94 is serially inductively coupled to all of the cores in the ring counter by passing through all of the readout apertures, respectively 61B through 66B.

The ring counter operates in the same manner as was described in connection with the ring counter shown in FIGURE 1. However, whenever it is desired to transfer the count of the ring counter to a memory core, then an output is obtained from the prime and readout current source which can have the waveform represented by the wave shape 98 shown in FIGURE 2 adjacent the winding 94. The first portion 98A represents the priming current pulse which is applied when readout is desired. The second portion 98B represents the readout portion of the pulse which transfers flux to the one of the memory cores which are coupled to the one of the ring counter cores which is in its "1" state.

The arrangement shown in FIGURE 2 is a nondestructive transfer into storage. If a destructive transfer is desired into storage, then both minor and major apertures may be driven by the transfer-to-store pulse 98B. In this case, an additional winding 100, shown in dotted lines, is provided which would pass through the main apertures of all the cores of the register. After a prime current is applied to the winding 94, a transfer to store pulse would be applied to the additional winding 100 passing through all the major apertures of all the cores, whereby a destructive transfer to one of the memory cores 88, 90, 92 would occur.

There has accordingly been described and shown herein a novel, useful circuit arrangement for an odd number ring counter employing multiaperture cores.

What is claimed is:

1. A counter for counting to $n$, where $n$ is an odd number, comprising a plurality of multiaperture magnetic cores, there being 2 $n$ magnetic cores in said plurality, each said multiaperture core having two stable states of magnetic remanence and being transferable from one to the other of said states, a separate winding means coupling each core to a succeeding core for successively transferring each magnetic core to one of its two states of stable magnetic remanence in response to an immediately preceding magnetic core being transferred to the other of its two states of stable magnetic remanence from said one state, and means for deriving an output indicative of their states of remanence from pairs of magnetic cores in said counter, the cores of a pair being determined as the $a$th core and the $a+n$th core in the core sequence where $a$ is any integer from 1 to $n$.

2. A magnetic core ring counter for counting to an odd number $n$, comprising 2 $n$ multiaperature cores arranged in a sequence, each said multiaperture core having two states of stable magnetic remanence and being drivable from one to the other of said two states of stable magnetic remanence, means for driving all of the odd numbered cores in said sequence of cores from their one to their other states of stable magnetic remanence, means for driving all of the even numbered cores in said sequence of cores from their one to their other stable states of magnetic remanence, transfer winding means coupling each core to a succeeding core for transferring said succeeding core to its one state of stable remanence when a preceding core is transferred from its one state of stable remanence to its other state of stable remanence, and means for deriving an output from each of the pair of cores in said ring counter indicative of the states of stable remanence of those pairs of cores, the cores of a pair being determined as the *a*th core and the *a*+*n*th core in said sequence of cores, wherein *a* is any integer from 1 to *n*.

3. A multiaperture ring counter for counting up to an odd number *n*, comprising 2 *n* multiaperture magnetic cores, said cores being arranged in a sequence, each said multiaperture magnetic core having an input aperture and an output aperture, each said multiaperture core having a "one" state of magnetic remanence and a "zero" state of magnetic remanence, means for alternatively applying a drive to all of the odd cores in said sequence and then to all of the even cores in said sequence for transferring a core from its one state of magnetic remanence to its zero state of magnetic remanence, a different transfer winding means coupling each magnetic core in said sequence by its input aperture to the succeeding magnetic core in said sequence by its output aperture for transferring said succeeding core to its one state of magnetic remanence when said preceding core is driven from its one state of magnetic remanence to its zero state of magnetic remanence, and output winding means coupled to pairs of cores in said sequence for deriving an output indicative of the count of said counter, said cores of a pair being determined as the *a*th core and the *a*+*n*th core, where *a* equals an integer from 1 to *n*.

4. A binary ring counter for counting an odd number *n*, comprising two *n* multiaperture magnetic cores, each magnetic core having a minor input aperture, and a minor output aperture, each core having a one state of magnetic remanence and a zero state of magnetic remanence and being drivable therebetween, all said cores being arranged in a sequence, means for alternately driving all the even cores in said sequence and then all the odd cores in said sequence from their "1" to their "0" states of magnetic remanence, means for alternately applying a priming current to the magnetic material surrounding the output apertures of said even cores and then of said odd cores, a plurality of transfer windings for transferring a succeeding core to its "1" state of remanence when a preceding core is driven from its "1" to its "0" state of remanence, a different one of said transfer windings coupling each core through its output aperture to a succeeding core through its input aperture, and means for deriving an output from successive pairs of cores of said counter indicative of the state of the count of said counter, the cores in a pair being determined as the *a*th core and the *a*+*n*th core where *a* is equal to an integer from 1 to *n*.

5. A ring counter as recited in claim 4, wherein said means for deriving an output from pairs of cores includes an output minor aperture in each core of a pair, an output winding coupled to both cores of a pair through said output apertures, and means for applying magnetomotive forces to the magnetic material surrounding the output apertures of each said cores for inducing a voltage in said output winding indicative of the state of remanence of said magnetic cores.

6. The improvement in a ring counter of the type including a plurality of multiaperture cores arranged for propagating sequentially through said cores a "1" representative state of magnetic remanence, means for converting said binary ring counter to an *n* count counter where *n* is an odd number, said improvement comprising output winding means coupled to pairs of cores of said counter for deriving an output therefrom indicative of the count of said counter, the cores of a pair being determined as the *a*th core in the core sequence of said binary counter and the *a*+*n*th core in said core sequence, where *a* is any integer from 1 to *n*.

7. The improvement in a binary ring counter made of a plurality of multiaperture cores which are arranged in a sequence and are coupled to one another for propagating sequentially a binary "1" representative state of remanence through said core sequence of an arrangement for enabling said ring counter to count to an odd number *n*, employing one count per bit, said improvement comprising an output winding for each pair of cores in said sequence of cores, the cores of a pair being determined as the *a*th core and the *a*+*n*th core where *a* is an integer from 1 to *n*, and means for serially coupling each output winding to a different pair of cores for deriving therefrom an output indicative of whether one of said pair of cores was in its "one" state of magnetic remanence.

8. The improvement in a binary ring counter made of a plurality of multiaperture cores which are arranged in a sequence and are coupled to one another for propagating sequentially a binary "1" representative state of remanence through said core sequence of an arrangement for enabling said ring counter to count to an odd number *n*, employing one count per bit, said improvement comprising an output winding for each pair of cores in said sequence of cores, the cores of a pair being determined as the *a*th core and the *a*+*n*th core where *a* is an integer from 1 to *n*, an output aperture in each core of said pair, each said output winding for a pair of cores being inductively coupled to the pair of cores by being threaded through said output apertures, a prime and readout winding inductively coupled to all of said cores by threading through the output apertures of all of said cores, and means for applying a priming and readout current to said prime and readout winding when it is desired to read the count state of said ring counter to provide an output indicative thereof in one of said output windings.

References Cited

UNITED STATES PATENTS

| | | | |
|---|---|---|---|
| 3,159,813 | 12/1964 | Dowling | 340—146.2 |
| 3,139,606 | 6/1964 | Hathaway | 340—146.2 |
| 3,219,986 | 11/1965 | Dowling | 340—174 |
| 3,243,775 | 3/1966 | English | 340—174 |

JAMES W. MOFFITT, *Primary Examiner.*

U.S. Cl. X.R.

307—88